US012536307B1

(12) United States Patent
Randeri et al.

(10) Patent No.: US 12,536,307 B1
(45) Date of Patent: Jan. 27, 2026

(54) DATA ACCESS CONTROL IN DATA PROCESSING APPLICATIONS

(71) Applicant: Amazon Technologies, Inc., Seattle, WA (US)

(72) Inventors: Jalpan Randeri, Sunnyvale, CA (US); Rahul Bhartia, Seattle, WA (US); Mehul Y. Shah, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 536 days.

(21) Appl. No.: 17/710,581

(22) Filed: Mar. 31, 2022

(51) Int. Cl.
*G06F 21/60* (2013.01)
*G06F 21/53* (2013.01)

(52) U.S. Cl.
CPC ............ *G06F 21/604* (2013.01); *G06F 21/53* (2013.01); *G06F 2221/033* (2013.01)

(58) Field of Classification Search
CPC ... G06F 21/604; G06F 21/53; G06F 2221/033
USPC .............................................................. 726/1
See application file for complete search history.

(56) References Cited

U.S. PATENT DOCUMENTS

| | | | | |
|---|---|---|---|---|
| 7,814,076 B2* | 10/2010 | Sack | ................... | G06F 21/6227 707/694 |
| 7,831,570 B2* | 11/2010 | Sack | ................... | G06F 21/6227 707/694 |
| 7,890,530 B2* | 2/2011 | Bilger | ................. | G06F 21/6218 707/791 |
| 8,185,548 B2* | 5/2012 | Lim | ................... | G06F 21/6227 709/200 |
| 9,497,219 B2* | 11/2016 | Lim | ........................ | G06F 9/468 |
| 10,803,518 B2* | 10/2020 | Raleigh | .............. | G06Q 20/0855 |
| 2005/0273605 A1* | 12/2005 | Saha | ........................ | G06F 21/53 713/166 |
| 2006/0248085 A1* | 11/2006 | Sack | ................... | G06F 21/6227 707/999.009 |
| 2007/0157288 A1* | 7/2007 | Lim | ..................... | H04L 63/105 726/1 |
| 2008/0010233 A1* | 1/2008 | Sack | ................... | G06F 21/6227 |
| 2008/0060051 A1* | 3/2008 | Lim | ........................ | G06F 16/93 726/1 |
| 2010/0107249 A1* | 4/2010 | Krig | ........................ | G06F 21/57 726/22 |

(Continued)

FOREIGN PATENT DOCUMENTS

WO    WO-2016010602 A2 *    1/2016    ............. G06F 21/44

OTHER PUBLICATIONS

Prasang Upadhyaya; Automatic Enforcement of Data Use Policies with DataLawyer; ACM: Year:2015; pp. 213-225.*

*Primary Examiner* — Monjur Rahim
(74) *Attorney, Agent, or Firm* — Nicholson De Vos Webster & Elliott LLP

(57) ABSTRACT

Techniques for data access control in data processing applications are described. A portion of user code including a first data access directed to a data source is received from an application. An identity associated with the portion of user code is obtained. A policy including an access control rule that limits access to the data source based at least in part on the identity is obtained. Data access code is generated by evaluating at least a portion of code associated with the first data access. A permitted data access result that complies with the policy is obtained by evaluating the data access code. The permitted data access result is sent to the application.

20 Claims, 9 Drawing Sheets

(56) References Cited

U.S. PATENT DOCUMENTS

| | | | |
|---|---|---|---|
| 2011/0219208 A1* | 9/2011 | Asaad | G06F 9/06 |
| | | | 712/12 |
| 2014/0040975 A1* | 2/2014 | Raleigh | H04L 12/1435 |
| | | | 726/1 |
| 2014/0189778 A1* | 7/2014 | Li | G06F 21/554 |
| | | | 726/1 |
| 2016/0381021 A1* | 12/2016 | Moore | H04L 63/102 |
| | | | 726/1 |
| 2018/0181498 A1* | 6/2018 | Makowski | G06F 21/51 |
| 2018/0302443 A1* | 10/2018 | Weiss | G06F 21/604 |
| 2020/0084132 A1* | 3/2020 | Chauhan | H04L 43/14 |
| 2021/0075794 A1* | 3/2021 | Gazit | H04L 63/1408 |

\* cited by examiner

DATA ACCESS CONTROL IN DATA PROCESSING APPLICATIONS

BACKGROUND

As an organization grows, the data it needs to manage often grows at a very fast rate. At the same time, the number of entities-both people and computer systems-needing access to that data is also increasing. Of course, not all of those entities need access to all of the organization's data, especially when some of that data might be sensitive in nature. Instead, administrators such as Information Technology ("IT") or data security personnel are faced with the task of controlling access to the organization's data in an increasingly complex environment. Administrators need to manage access control to new data sources for existing entities and, at the same time, manage access control for new entities to existing data sources. Since both entities and sources are generally increasing, that management undertaking can quickly become challenging and may become intractable without more sophisticated data access control techniques.

BRIEF DESCRIPTION OF DRAWINGS

Various embodiments in accordance with the present disclosure will be described with reference to the following drawings.

DETAILED DESCRIPTION

Figure 1:
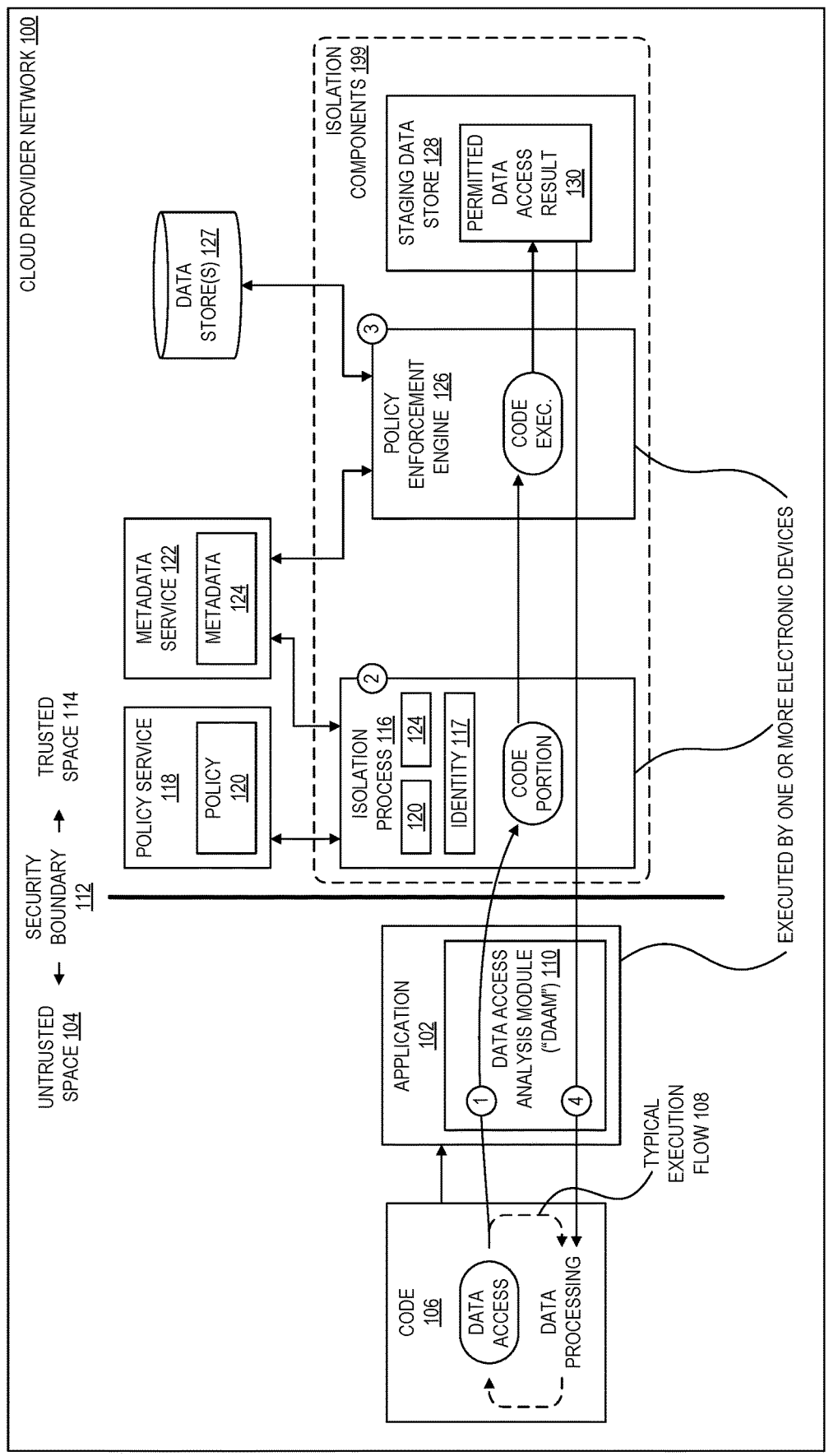
FIG. 1 is a diagram illustrating a data access control system in a cloud provider network according to some embodiments.

The present disclosure relates to methods, apparatus, systems, and non-transitory computer-readable storage media for data access controls in data processing applications. According to some embodiments, a security boundary isolates a data processing application from a data source. The security boundary separates an untrusted space (in which the data processing application executes) from a trusted space (in which one or more components that isolate the data processing application from the data source execute). An administrator can configure a policy that controls what data and/or what form the data takes that traverses the security boundary from the data source to the data processing application. The isolation components operating within the trusted space obtain a data access operation from the untrusted space along with an indication of an identity of the entity attempting to perform the operation. The isolation components enforce a policy associated with the identity by, for example, performing the data access operation and then removing and/or masking data per the policy. Alternatively or in addition to data removal and masking, the isolation components can enforce the policy by performing a modified data access operation in some embodiments.

In some embodiments, a data access analysis module ("DAAM") is incorporated or otherwise integrated with a data processing application to identify and export a portion of entity code that involves a data access. The DAAM sends the data access code portion to an isolation process across in a trusted space across a security boundary. The isolation process gathers certain information such as metadata about the data source being accessed, an indication of the identity of the entity that submitted the code to the data processing application, and a policy of the data source associated with the identity. A policy enforcement engine executes the data access and stores a result that complies with the policy. The DAAM obtains the result and returns it to the data processing application. The terms "code" and "query" may be used interchangeably herein to refer to the instruction(s) or command(s) submitted by a user for execution by a data processing application. Such instructions may be written in a variety of languages including compiled, interpreted, and scripted languages. Exemplary languages include Java, Javascript, Python, R, C/C++, Structured Query Language ("SQL"), and Scala.

Shifting the execution of the data access into a trusted space allows for more granular control of data accesses. Existing data access control techniques often involve associating entities accessing data sources and data sources into groups. For example, an organization might have departments (e.g., research and development, sales, marketing, human resources, etc.), each department having several groups of people. Similarly, computing infrastructure supporting the organization might be externally facing (e.g., a web server accessible via the internet) or internal (e.g., a database server). Devices in the computing infrastructure can be similarly grouped. While grouping reduces the administrative task of managing permissions for individual entities performing data accesses to individual data sources, managing data access policies that govern who can access what remains a challenging endeavor. Some embodiments described herein reduce the administrative challenge of managing data access controls by allowing an administrator to define "aliases" that execute code customized to the particular entity making a data access request. As one example, an administrator can define an SQL view that includes code that upon evaluation changes the resulting view or how the view is generated dependent upon the entity making the request. Additionally or alternatively, some embodiments described herein reduce the administrative challenge of managing data access controls by allowing an administrator to define data access control policies using arbitrary code. In doing so, the administrator can create dynamic rules that adjust based on the data being accessed, the identity of the entity attempting the access, and so on. Such code-based policies can be authored to be generally applicable to many different entities attempting to access data, reducing the need to manage separate policies for different individuals or groups.

In some embodiments, the data access controls are integrated as part of a data processing service of a cloud provider network. One such service is Amazon Web Services' ("AWS") EMR, a big data platform for running large-scale distributed data processing jobs, SQL queries, and machine learning (ML) applications using open-source analytics frameworks such as Apache Spark, Apache Hive, and Presto. Users submit workloads (also referred to as jobs, tasks, etc.) to the data processing service, and the data processing service manages the execution of those workloads by an analytics framework running on the infrastructure of the cloud provider network. Often, such workloads are executed by a cluster of computing instances (e.g., virtual machines, containers, etc.).

FIG. 1 is a diagram illustrating a data access control system according to some embodiments. In this example, an entity such as a user or other computer system has submitted code 106 to an application 102, and the code 106 includes a data access to an access-controlled (or protected) data source stored in one or more data store(s) 127. The data access control system includes one or more isolation components 199. As illustrated, the application 102 is in an untrusted space 104 (sometimes referred to as "user" space), while the isolation components 199 are in a trusted space 114. Exemplary applications include Apache Spark, Apache Hive, and Presto, although more generally the application 102 entails an application that can perform, amongst other things, code that queries an access-controlled data source. Code 106 includes a data access operation. Users or other data accessing entities often submit code 106 to the application 102 for processing. Examples of code 106 presented herein are typically shown in SQL (and often in a form of pseudo-code to increase readability), although other languages may be used, including Java, Javascript, Python, R, C/C++, and Scala to name a few. Code 106 can include a single data access (e.g., an SQL query like "SELECT * FROM SOME_TABLE") or, in some cases, include one or more rounds of a data access followed by processing of the accessed data, as shown by the cycle of data accesses and data processing indicated as typical execution flow 108.

In some embodiments, the data access control system illustrated in FIG. 1 operates within a cloud provider network 100. A cloud provider network (or just "cloud" or "provider network") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Exemplary computing resources offered by a cloud provider network include a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., (databases, application build/deployment services), access policies or roles, identity policies or roles, machine images, routers and other data processing resources, etc. These and other computing-related resources are often provided as services, such as a hardware virtualization service that can execute compute instances, a storage service that can store data objects, etc.

To provide these and other computing resource services, cloud provider networks often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

Here, the application 102 is executed or hosted using resources of the cloud provider network 100, although the data access control techniques described herein can be extended to non-cloud environments. Similarly, the isolation components 199 can be executed or hosted using resources of the cloud provider network 100. Typically, the application 102 processing the code 106 would follow the execution flow 108 where the data access(es) and data processing are performed by the application itself. To facilitate access control, a data access analysis module ("DAAM") 110 is integrated with the application 102. The integration can vary depending on the application. For example, some applications may support "plug-in" type modules while others may be open source and allow incorporation of DAAM functionality directly into the application 102 (e.g., via integration with a development kit in which user's develop their code). The DAAM 110 monitors execution of the code 106 by the application 102 for accesses to an access-controlled or otherwise protected data source.

At circle 1 of FIG. 1, upon identifying a portion or segment of the code 106 that will attempt a data access (or the entirety of the code in the case of a single query) of access-controlled data (e.g., in data store(s) 127), the DAAM 110 shifts execution of the identified data access code from the application 102, across a security boundary 112, and to an isolation process 116 operating in a trusted space 114.

The security boundary 112 can be implemented in a variety of ways dependent upon how the application 102 and the exemplary isolation components 199, including an isolation process 116 and a policy enforcement engine 126, are executed. For example, each of the application 102, the isolation process 116, and the policy enforcement engine 126 can be processes executed in the same operating system environment. In that case, process level controls of the operating system can act as the security boundary 112. In the cloud provider network context, the variety of execution platforms is numerous. For example, the processes can be executed within a common environment of a virtual machine or container, across virtual machines or containers on a single underlying host computing system that is part of the cloud provider network's infrastructure fleet, and/or across host computer systems. In such cases, the security boundary 112 can provided by process-level isolation at the operating system level, container-level isolation at the container engine level, virtual machine-level isolation at the host computer system level, and/or network-level isolation at the infrastructure level (e.g., by enforcing an API between the DAAM 110 in the untrusted space 104 and the isolation process 116 in the trusted space 114).

In some embodiments, the untrusted space 104 is distinguished from the trusted space 114 in that the access-controlled data source is accessible by components in the trusted space 114 whereas access is controlled by components in the untrusted space 104.

At circle 2 of FIG. 1, the isolation process 116 obtains various information based on or about the code portion received from the DAAM 110. As illustrated, that information includes a policy 120 from a policy service 118, metadata 124 from a metadata service 122, and an identity 117. In this context, the identity 117 refers to an item that identifies origin of the requester. For example, the identity 117 may be determined from a process identifier that the isolation process 116 obtains from the operating system (e.g., when the application process 102 and isolation process 116 are running in the same environment). As another example, the identity 117 may be determined from a token that includes or otherwise represents the identity of the entity attempting the data access. The DAAM 110 can send such a token when sending the code portion to the isolation process 116. Often such tokens are cryptographically secured by another entity trusted by the isolation process 116.

The isolation process 116 obtains a policy 120 for the attempted data access from the policy service 120. In general, the policy service 120 provides for the creation, storage, and retrieval of policies that govern operations including data accesses (e.g., reads, writes, etc.) to access-controlled resources. Exemplary policy services 118 include AWS Identity and Access Management ("IAM"), AWS Lake Formation, AWS Glue, and Apache Ranger. Policies can be defined in a variety of ways. For example, the policy 120 might be associated with the identity 117 (e.g., of a particular entity or based upon the group membership of that entity) or with the target of the data access (e.g., a database, a file system, etc.) as identified in the code portion received from the DAAM 110.

Figure 3:
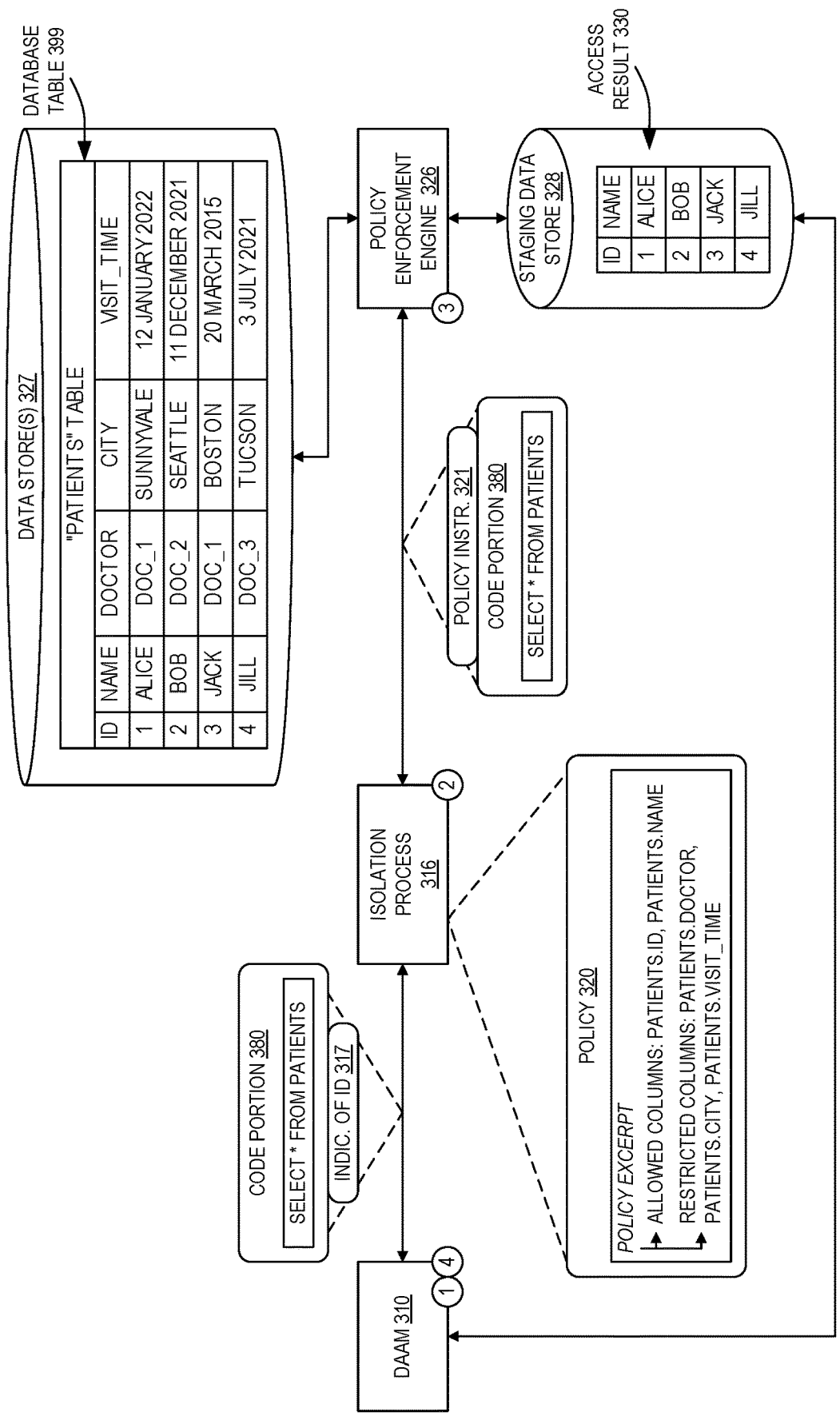
FIG. 3 is a diagram illustrating a form of data access control according to some embodiments.
Figure 4:
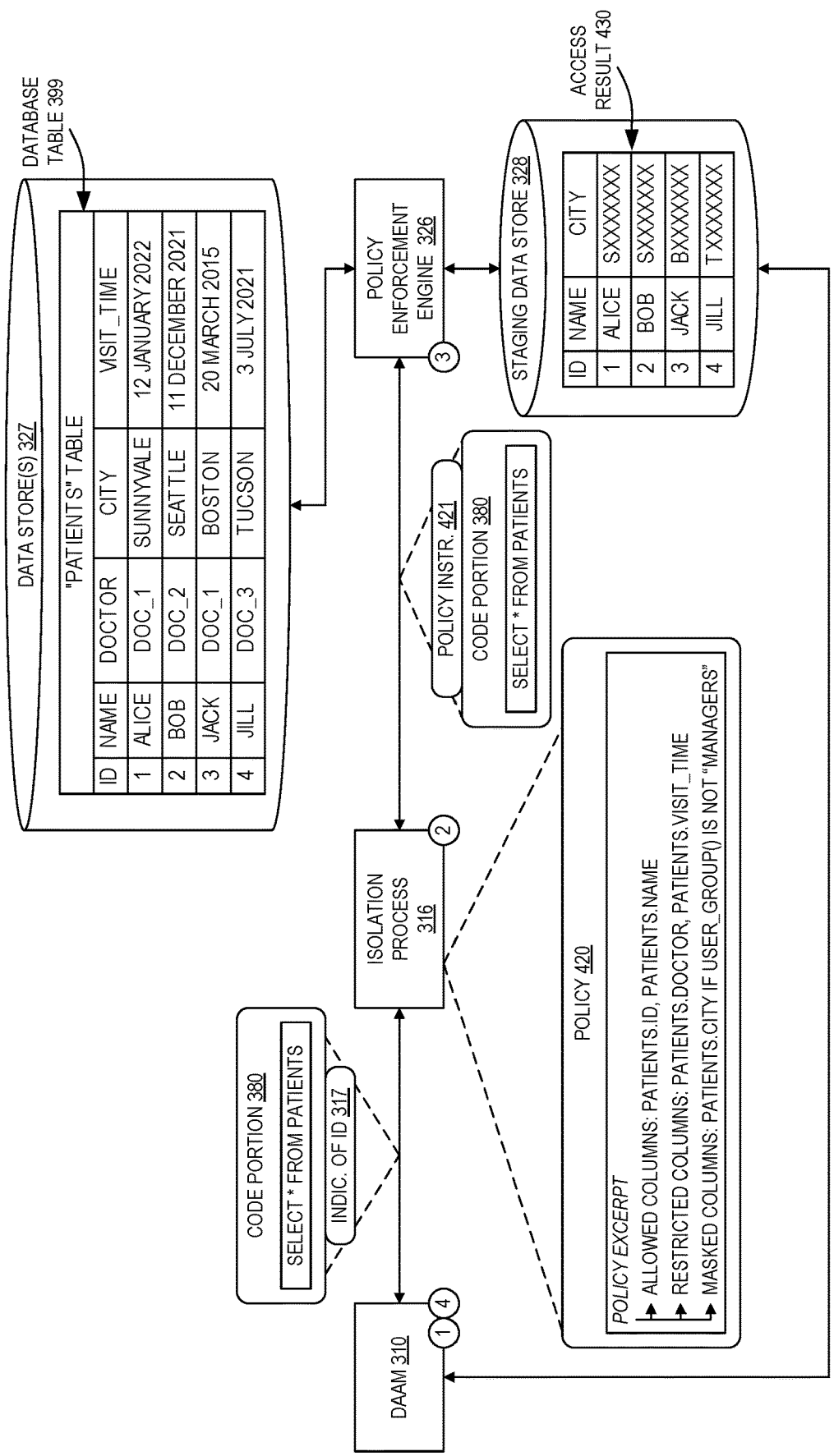
FIG. 4 is a diagram illustrating another form of data access control according to some embodiments.
Figure 5:
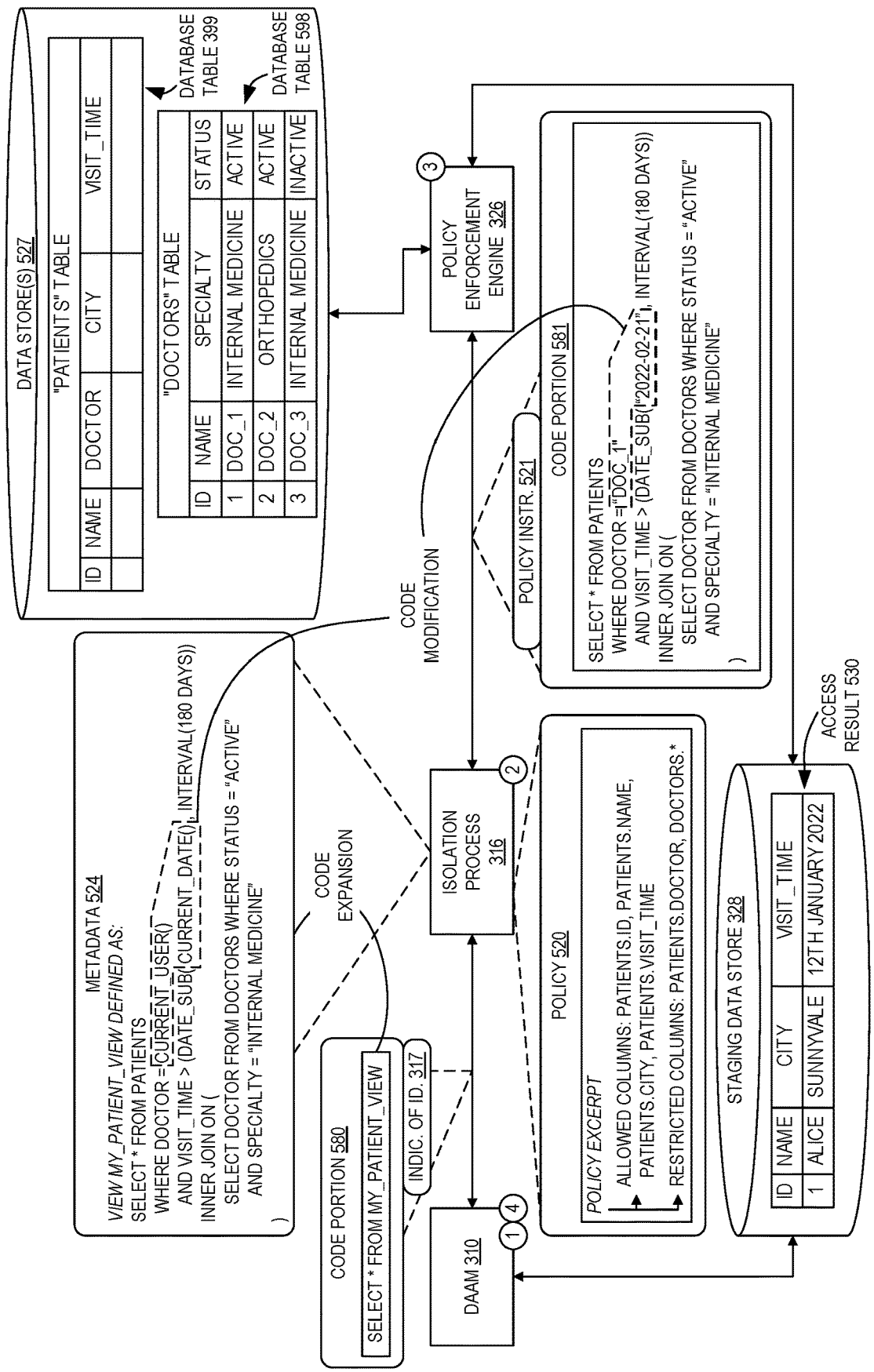
FIG. 5 is a diagram illustrating another form of data access control according to some embodiments.

A policy general includes one or more rules that govern "who" can access "what." "Who" can be specified in terms of specific entities or groups of entities, while "what" can be specified at various degrees of granularity from a data source as a whole (e.g., a distributed file system, a database) to components of that data source (e.g., a directory in a file system, a table in a database). For example, a simple policy could be constructed to permit access to a "payroll" table in an organization's database by requestors in the organization's human resources department and to deny access to all other requestors. Policies may include a default (allow or deny) for certain types of operations unless the converse is specified for a particular entity or group. Additionally, policies can be defined with parameters extending beyond "who" and "what"—for example, some policies may be defined with time-based restrictions (e.g., data accesses are permitted during business hours). Policies are often specified in JavaScript Object Notation ("JSON"), although other formats can be used. Some example policies are shown in FIGS. 3-5.

The isolation process 116 obtains metadata 124 from a metadata service 122 related to the target of the data access (e.g., a database or file system stored in one or more data store(s) 127) as identified in the code portion received from the DAAM 110. Metadata 124 includes data that describes the form of the data store being access. In database terms, metadata 124 may be a catalog that, for example, describes various database structures or schema, including the tables in the database, views of the data, data typing/restrictions on data in the tables, etc.

The isolation process 116 evaluates the policy 120, the identity 117, and the metadata 124 against the code portion received from the DAAM 110. For example, the code portion might include the query "SELECT * FROM TABLE_NAME," and the metadata 124 might indicate that the table, TABLE_NAME, has three columns, A, B, and C, while the policy 120 might indicate that the identity 117 is not permitted to access column C. Based on its evaluation, Based on its evaluation, the isolation process 116 instructs the policy enforcement engine 126 to execute the code portion. In some embodiments, the isolation process 116 provides the code portion received from the DAAM 110 in unmodified form to the policy enforcement engine 126. The isolation process 116 might include additional instructions or commands such as an instruction to remove a column, mask a column, or otherwise limit access to some data in the data source based upon what the identity 117 is permitted under the policy 120. Examples of data removal and masking are provided in FIGS. 3 and 4, respectively. In some embodiments, the isolation process 116 may expand and/or modify the code portion prior to sending it to the policy enforcement engine 126. An example of this is provided in FIG. 5.

At circle 3 of FIG. 1, the policy enforcement engine 126 executes the code received from the isolation process 116 and stores a resulting permitted data access result 130 in a staging data store 128. The policy enforcement engine 126 can be an instantiation of the application 102. For example, if the entity submitting the code 106 submitted it to a particular data processing application 102 in the untrusted space 104, the policy enforcement engine 126 can be a separate instantiation of that data processing application operating in the trusted space 114 and executing code submitted by the isolation process 116. Such code might be the original code received from the untrusted space 202 with additional instructions to delete or modify resulting data, or modified versions of code received or otherwise identified from the untrusted space 202.

In some embodiments, the policy enforcement engine 126 obtains one or more of the identity 117, the policy 120, or the metadata 124, either from the isolation process 116 or from the other services (e.g., an identity service, the policy service 118, the metadata service 122). For example, the policy enforcement engine 126 can request metadata 124 about the target of the data access in the code to be executed from the metadata service 122. Such metadata 124 may be useful for operations such as planning and locating data in cases where the data source is a distributed data source stored across multiple data stores 127 and the policy enforcement engine is a distributed computing application. For example, the policy enforcement engine 126 can use the metadata 124 to determine a distribution of the code execution and data accesses amongst members of a distributed. The policy enforcement engine 126 store the result(s) of the code execution in a staging data store 128, illustrated in FIG. 1 as the permitted data access result 130—that is, the result of the code portion originally identified by the DAAM 110 subject to the application of a policy.

At circle 4 of FIG. 1, the DAAM 110 obtains the permitted data access result 130 from the staging data store 128 (e.g., after receiving a notification that execution is complete originating from the policy enforcement engine 126, by monitoring the staging data store 128, etc.). In some embodiments, the policy enforcement engine 126 sends the permitted data access result 130 to the DAAM 110 without the use of an intermediate staging area (not shown).

Figure 2:
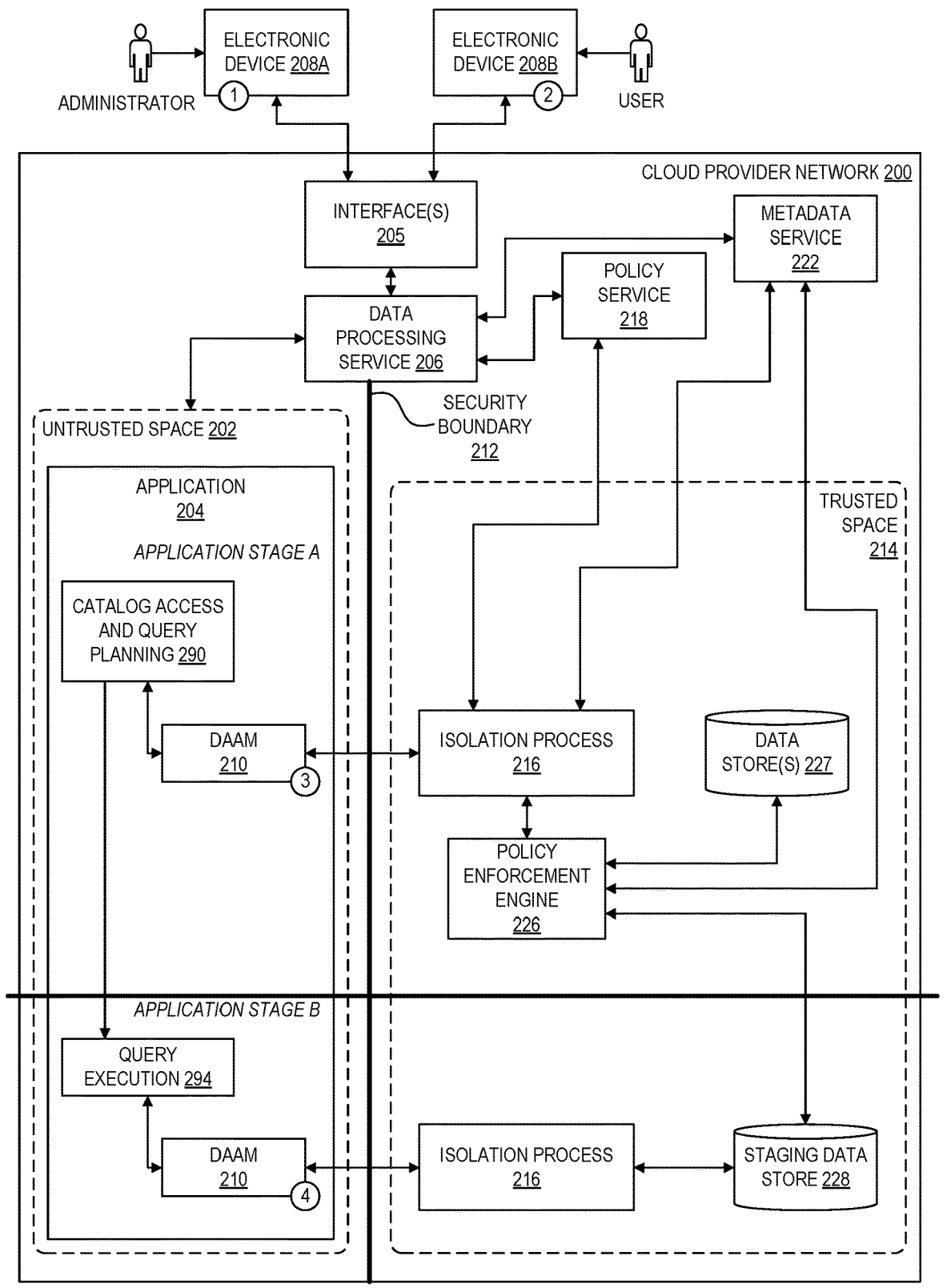
FIG. 2 is a diagram illustrating another data access control system in a cloud provider network according to some embodiments.

FIG. 2 is a diagram illustrating another data access control system in a cloud provider network according to some embodiments. In this example, a multi-stage application 204 is illustrated at various processing stages alongside the corresponding integration with various isolation components. The various stages of processing—in this case, stages A and B—occur over time and are separated by bold horizontal lines. As in FIG. 1, a security boundary 212 separates an untrusted space 202 from a trusted space 214.

Before discussing the stages of the application 202 and isolation components, the environment in which they are illustrated is further described. At circle 1 of FIG. 2, an administrator interacts with a cloud provider network 200 using an electronic device 208A (e.g., a personal computer, mobile device, etc.). Devices outside of a provider network interact with the provider network across one or more intermediate networks (e.g., the internet) via one or more interface(s) 205, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 205 can be part of, or serve as a front-end to, a control plane of the provider network 100 that includes "backend" services supporting and enabling the services that can be more directly offered to customers.

The administrator can perform various operations, including, for example, setting up and configuring a data source stored in data store(s) 227 using another service (not shown). The administrator can provide or create metadata describing that data source stored in the metadata service 222. Exemplary metadata includes database catalogs, which can include specifications for things like objects and views stored in or otherwise associated with the database. The administrator can configure one or more policies that govern access control to the data source with the policy service 218. The administrator can make the data source available for use with a data processing service 206. The data processing service 206 allows users to submit data processing tasks (e.g., queries or code). The data processing service 206 manages the lifecycle of computing resources allocated to perform users' tasks using infrastructure of the cloud provider network 200.

At circle 2 of FIG. 2, a user interacts with the cloud provider network 200 via the interface(s) 205 using an electronic device 208B. For example, the user can submit a query or code to the data processing service 206 that includes at least an access to the data source stored in the data store(s) 227. The data processing service 206 allocates computing resources of the cloud provider network 200 for the task, which in turn begin executing the application 204 to process the user's query or code (not shown). In the example discussion that follows, the user has submitted a query to retrieve data stored in a students table of a school database (e.g., "SELECT * FROM SCHOOL.STUDENTS").

In this example, the processing stages of the application 204 include catalog access and query planning 290 (stage A) and query execution 294 (stage B). These stages are (or variations thereof) are common in "big data" applications such as those that process queries against distributed data sources using distributed computing. During catalog access and query planning, the application 204 gathers information about the data source being accessed, locates the data needed to execute the user code, and divides operations to carry out the query amongst members of a distributed computing cluster. During query execution, the application 204 provides the cluster members the location of the data upon which they are to operate and instructs them to perform their assigned operations.

At circle 3 of FIG. 2 and during stage A, a DAAM 210 interacts with an isolation process 216 to send the data access code or query and to obtain metadata about the data source being accessed for use by the application 204. Catalog accesses can be considered a data access because some of the metadata associated with the data source can be sensitive or otherwise restricted for some requestors. In some embodiments, the DAAM 210 extracts the parts of the code or query prior to sending it to the isolation process 216. For example, the DAAM 210 can identify that the access is to a table STUDENTS of a database SCHOOL and that the query is requesting access to all columns in that table. Additionally, the DAAM 210 can identify the user (e.g., "ALICE") by, for example, checking a variable of the environment in which the application 204 is executing.

The isolation process 216 receives the catalog access from the DAAM 210, possibly in extracted form, and the identity of the requestor. The isolation process 216 obtains metadata about the target data source from a metadata service 222 and a policy from a policy service 218 that includes one or more rules governing ALICE's ability to access data in the SCHOOL database and the STUDENTS table. The metadata can indicate that the STUDENTS table includes three columns, a student identification number (ID), a name (NAME), and an address (ADDRESS), while the policy can indicate that ALICE is not permitted to access student addresses. The catalog service isolation process can evaluate the metadata and policy and, because ALICE is only permitted to access the student identification number and name, return metadata to the DAAM 210 such that, from the perspective of the application 204, the address column of the STUDENTS table does not exist.

Also during stage A, the DAAM 210 interacts with the isolation process 216 to obtain file information about the data source being accessed for use by the application 204. Typically, the application 204 will access data using a logical object (e.g., a file name, a table name, etc.). The isolation process 216 hides the location of the original sources files that make up the data source (e.g., Spark RDDs, Hadoop DFS) in the trusted space 214. At this point, the isolation process 216 can inform the DAAM 210 of the location of the staging data store 228 in which the permitted data access result(s) will be stored. When accessing data, the DAAM 210 can serve as the logical endpoint for data accesses by the application 204. In this manner, the file locations of the data source in the data store(s) 227 remain obscured from the application 204.

The isolation process 216 can initiate the execution of the data access subject to the policy by the policy enforcement engine 226. The data access code sent from the isolation process 216 to the policy enforcement engine 226 can be the original data access code received from the DAAM 210 (e.g., SELECT * FROM SCHOOL.STUDENTS) along with a data processing command to drop the address column from the result (e.g., ALTER TABLE [RESULT] DROP COLUMN ADDRESS"). The isolation process 216 can also inform the policy enforcement engine 226 of the staging data store 228 in which to store the result(s) of the operations.

As described above, the policy enforcement engine 226 may launch another instantiation of the application 204 for purposes of executing the code portion isolated by the DAAM 210 and subject to the access control policy. During execution, the policy enforcement engine 226 can access the metadata service 222 as part of performing an unrestricted catalog access, query planning, and query execution stages on the portion of code offloaded to the trusted space 214 by the DAAM 210. The policy enforcement engine 226 stores the result in the staging data store 228.

At circle 4 of FIG. 2 and during stage B, a DAAM 210 interacts with the isolation process 216 to access the resulting permitted data access result from the staging data store 228 for additional data processing. Note that in a distributed application, each node of a distributed computing cluster can incorporate a DAAM 210 that accesses the respective portion of the permitted data access result assigned to that cluster member.

In some embodiments, the metadata may include code that is referenced by the code or query sent by the DAAM 210 to the isolation process 216 during stage A. For example, the metadata may define a view of a database, while the query accesses that view. A view is generally a stored data access. The data access may combine data from different database(s) and/or table(s) to create a "virtual" result.

FIG. 3 is a diagram illustrating a form of data access control according to some embodiments. In this example, a policy that permits and restricts access to certain data is described. To begin, an exemplary "PATIENTS" database table 399 is stored in data store(s) 327, the table 399 having columns ID, NAME, DOCTOR, CITY, and VISIT_TIME (to reflect the name of the patient's last visit to the doctor).

At circle 1 of FIG. 3, a DAAM 310 identifies a data access of the form "SELECT * FROM PATIENTS" for an application operating in an untrusted space (not shown). The DAAM 310 sends that code portion 380 along with an indication of an identity 317 of the requestor to an isolation process 316.

At circle 2 of FIG. 3, the isolation process 316 obtains a policy 320 relating the identity 317 to the database table 399 (e.g., from a policy service, not shown). The policy 320 indicates that the identity 317 is permitted to access the ID and NAME data but restricted from to the other data. The isolation process 316 then instructs a policy enforcement engine 326 with the code portion 380 as well as instruction(s) 321 to enforce the policy (e.g., to delete the restricted columns from the result).

At circle 3 of FIG. 3, the policy enforcement engine 326 executes the code portion 380 as well as the instruction(s) 321 to enforce the policy and stores the output as the access result 330 in a staging data store 328. As illustrated, the access result 330 includes the permitted data and omits the restricted data.

At circle 4 of FIG. 3, the DAAM 310 retrieves or otherwise obtains the access result 330 from the staging data store 328.

FIG. 4 is a diagram illustrating another form of data access control according to some embodiments. In this example, a policy that permits and restricts access to certain data, as well as masks data, is described. Again, an exemplary "PATIENTS" database table 399 is stored in data store(s) 327.

At circle 1 of FIG. 4, the DAAM 310 identifies a data access of the form "SELECT * FROM PATIENTS" for an application operating in an untrusted space (not shown). The DAAM 310 sends that code portion 380 along with an indication of an identity 317 of the requestor to an isolation process 316.

At circle 2 of FIG. 4, the isolation process 316 obtains a policy 420 relating the identity 317 to the database table 399 (e.g., from a policy service, not shown). The policy 320 indicates that the identity 317 is permitted to access the ID and NAME data, restricted from accessing the DOCTOR and VISIT_TIME data, and includes code indicating that the identity 317 is permitted to access CITY data if the identity 317 is in a "MANAGERS" group, otherwise the CITY data is masked. The isolation process 316 then instructs a policy enforcement engine 326 with the code portion 380 as well as instruction(s) 421 to enforce the policy. In some embodiments, the isolation process 316 evaluates the code portion of the policy (e.g., to check whether the identity 317's group is "managers") and includes an explicit instruction to mask the CITY data if that check fails in instructions 421. In other embodiments, the isolation process 316 evaluates a portion of the code in the policy to substitute the group including the identity 317 (e.g., the USER_GROUP( ) call) and includes the code to evaluate the condition in instructions 421. Various masking techniques can be used, such as substituting all but the first character in the data field with a dummy character (shown).

At circle 3 of FIG. 4, the policy enforcement engine 326 executes the code portion 380 as well as the instruction(s) 421 to enforce the policy and stores the output as the access result 430 in a staging data store 328. As illustrated, the access result 430 includes the permitted data, a masked version of the masked data, and omits the restricted data.

At circle 4 of FIG. 4, the DAAM 310 retrieves or otherwise obtains the access result 430 from the staging data store 328.

FIG. 5 is a diagram illustrating another form of data access control according to some embodiments. In this example, a custom view is defined in the metadata associated with a data source and a that permits and restricts access to certain data is described. Again, an exemplary "PATIENTS" database table 399 is stored in data store(s) 327. A "DOCTORS" table 598 of the same database is also stored in data store(s) 327.

At circle 1 of FIG. 5, the DAAM 310 identifies a data access of the form "SELECT * FROM MY_PATIENT_VIEW" for an application operating in an untrusted space (not shown). The DAAM 310 sends that code portion 580 along with an indication of an identity 317 of the requestor to an isolation process 316.

At circle 2 of FIG. 5, the isolation process 316 obtains a policy 520 relating the identity 317 to accessed database tables 398, 399 (e.g., from a policy service, not shown). The policy 520 indicates that the identity 317 is permitted to access the ID, NAME, CITY, and VISIT_TIME data and restricted from accessing the PATIENTS.DOCTOR and the DOCTORS table data. Additionally, the isolation process 316 obtains the view definition of "MY_PATIENT_VIEW" stored in metadata 524 from a metadata service (not shown) and expands the original code as indicated by code expansion. Additionally, the isolation process 316 evaluates the code contained in the view to dynamically adjust it for the current query as indicated by code modification. In particular, the isolation process 316 substitutes CURRENT_USER ( ) call in the generic view definition with the identity of the requestor, in this case "DOC_1". The isolation process 316 also substitutes the CURRENT_DATE( ) call in the generic view definition with the current date.

The isolation process 316 then instructs a policy enforcement engine 326 with the expanded and modified code portion 581 as well as instruction(s) 521 to enforce the policy (e.g., to delete the restricted columns from the result).

At circle 3 of FIG. 5, the policy enforcement engine 326 executes the code portion 581 as well as the instruction(s) 421 to enforce the policy and stores the output as the access result 530 in a staging data store 328. As illustrated, the access result 530 includes the permitted data and omits the restricted data. Of note, the policy enforcement engine 326 was able to use the "DOCTORS" table in generating the access result 530 despite the original requestor being denied access to it in the policy 520.

At circle 4 of FIG. 5, the DAAM 310 retrieves or otherwise obtains the access result 530 from the staging data store 328.

As is apparent from the above-described embodiments of a data access control system, both the policy and the data source metadata can be used to create user- or group-specific results. In this manner, the administrative burden of managing permissions is reduced, at least through the use of the ability to write and execute code describing data access constraints in policies and/or data source metadata.

It is noted that communications between the DAAM, the isolation process, and the policy enforcement engine are typically via APIs.

As indicated above, the data access techniques described herein can support a variety of languages. To provide some non-SQL code examples that can be handled using the data access techniques described herein, some Scala-based examples are provided below. The following example provides a simple Scala-based query.

```
# Simple Example
val df = spark.table ("PATIENTS")
df.select ("name", "city")
    .filter (city => city.equals ("sunnyvale") )
    .limit (100)
df.collect ( )
    .coalsec (1)
    .write
    .format ("csv")
    .save ("patients.csv")
```

The following Scala-based example is a join that includes code based upon the user identity.

```
Join Example
val currentUser = System.getenv ("USER_NAME")
/ / create data frame for PATIENTS table
val patients_df = spark.table ("PATIENTS")
    .select ("name", "doctor")
    .filter (doctor => doctor.equals (currentUser) )
    .filter (visit_time => { Datatime.now (UTC) - visit_time) <=
        TimeUnit.Month.to (6) } )
/ / create data frame from DOCTORS table
val doctor_df = spark.table ("DOCTORS")
    .select ("name")
    .filter (status => status == "ACTIVE")
    .filter (speciality => speciality == "INTERNAL MEDICINE")
```

-continued

```
/ / perform join
val patients_view = patients_df
    .join (doctor_df, patients_df ("doctor") == doctor_df ("name") ,
        "inner")
    .collect (n=100) // limit output to 100 rows
/ / save output to file
patients_view.coalsec (1).write.format ("csv")
    .save ("my_patients_view.csv")
```

Figure 6:
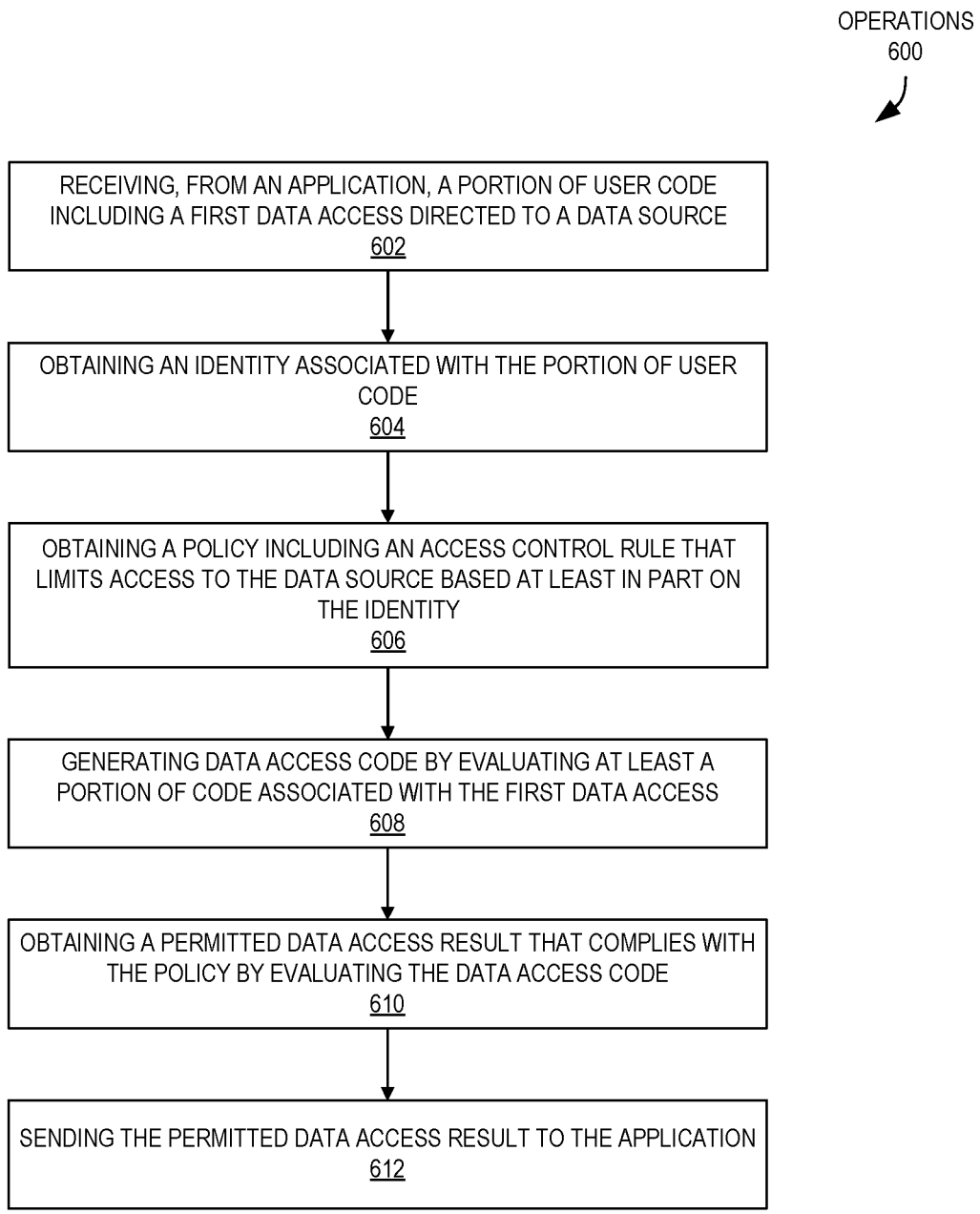
FIG. 6 is a flow diagram illustrating operations of a method for data access control according to some embodiments.

FIG. 6 is a flow diagram illustrating operations 600 of a method for data access control according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by the isolation process and/or the policy enforcement engine of the other figures.

The operations 600 include, at block 602, receiving, from an application, a portion of user code including a first data access directed to a data source. As described herein, an isolation process (e.g., the isolation process 116, 216, 316) can receive code portions that include requests, queries, or other instructions to access an access-controlled or otherwise protected data source. Such code portions are typically part of user code submitted for execution by an application. For example, a data processing service of a cloud provider network can allow users the ability to submit code. The data processing service can launch an application to execute the user-submitted code. Applications can include database applications, machine learning applications, data processing applications, and data analytics applications. The user code can be authored in a variety of languages, including Java, Javascript, Python, R, C/C++, Structured Query Language ("SQL"), and Scala, for example.

In some embodiments, a module integrated with the application such as the DAAM described herein can monitor execution of the user-submitted code (which may also be referred to as a job or task) by the application for data access requests and shift the execution of those data accesses to the isolation process. In some embodiments, a security boundary such as those described herein can separate isolation components such as the isolation process from the application executing user-submitted code.

The operations 600 further include, at block 604, obtaining an identity associated with the portion of user code. As described herein, the isolation process can obtain an identity associated with the entity initiating the data access request. For example, the identity can be obtained from an operating system or from a token included with the portion of user code, such as described with reference to circle 2 of FIG. 1.

The operations 600 further include, at block 606, obtaining a policy including an access control rule that limits access to the data source based at least in part on the identity. As described herein, the isolation process can obtain a policy from, for example, a policy service (e.g., the policy service 118, 218). Policies can be specified in a variety of forms such as those described herein.

The operations 600 further include, at block 608, generating data access code by evaluating at least a portion of code associated with the first data access. As described herein, the isolation process and/or the policy enforcement engine can evaluate code as part of providing data access controls. As described with reference to FIG. 4, for example, the isolation process 316 can evaluate code in a policy and send data access code to the policy enforcement engine 326 for evaluation. In that example, the evaluated code is stored as part of the policy 420, and the data access code includes the code portion 380 and the instruction(s) 421 to enforce the policy.

As described with reference to FIG. 5, for example, the isolation process 316 can evaluate code in metadata and send data access code to the policy enforcement engine 326 for evaluation. In that example, the evaluated code is stored as part of the metadata 524 associated with the data store(s) being accessed, and the data access code includes the code portion 521 and the instruction(s) 521 to enforce the policy.

The operations 600 further include, at block 610, obtaining a permitted data access result that complies with the policy by evaluating the data access code. As described herein, a policy enforcement engine (e.g., the policy enforcement engine 126, 226, 326) with access to an access-controlled data source can evaluate code to generate a result that limits the result(s) to that permitted by the policy. In some embodiments, the access-controlled data source is another instantiation of the application from which the original portion of user code was received (e.g., if the original application executing suer code was a Spark process, the policy enforcement engine may be another instantiation of a Spark process executing in a trusted space).

The operations 600 further include, at block 612, sending the permitted data access result to the application. As described herein, the DAAM can serve as a logical endpoint through which an application operating in an untrusted space can access the permitted data. In some embodiments, the DAAM accesses the permitted data access result from a staging data store, and the staging data store can send the permitted data access result to the DAAM. In some embodiments, the DAAM accesses the permitted data access result from the staging data store via an isolation process, which accesses the staging data store and sends the permitted data access result to the DAAM.

Figure 7:
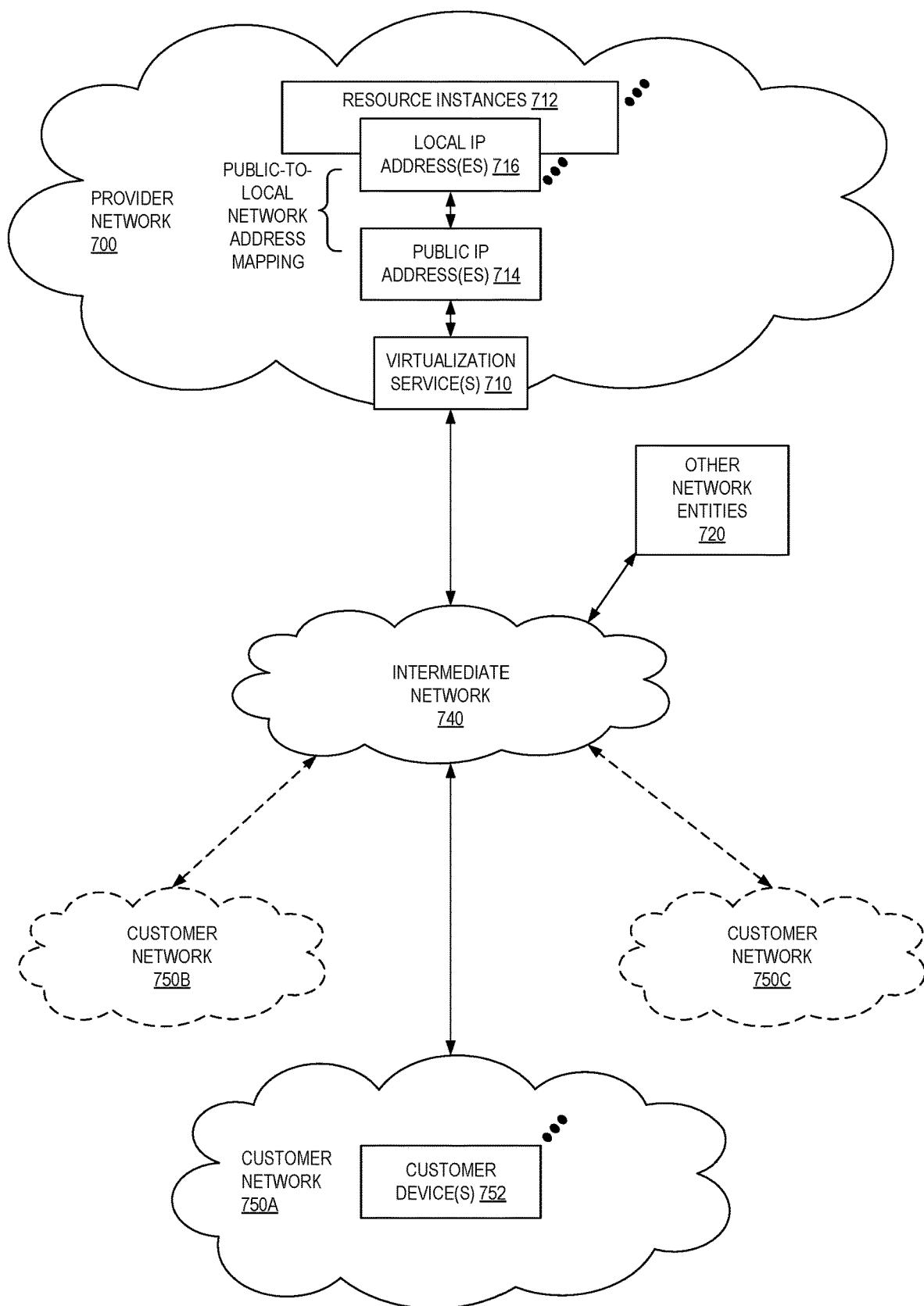
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
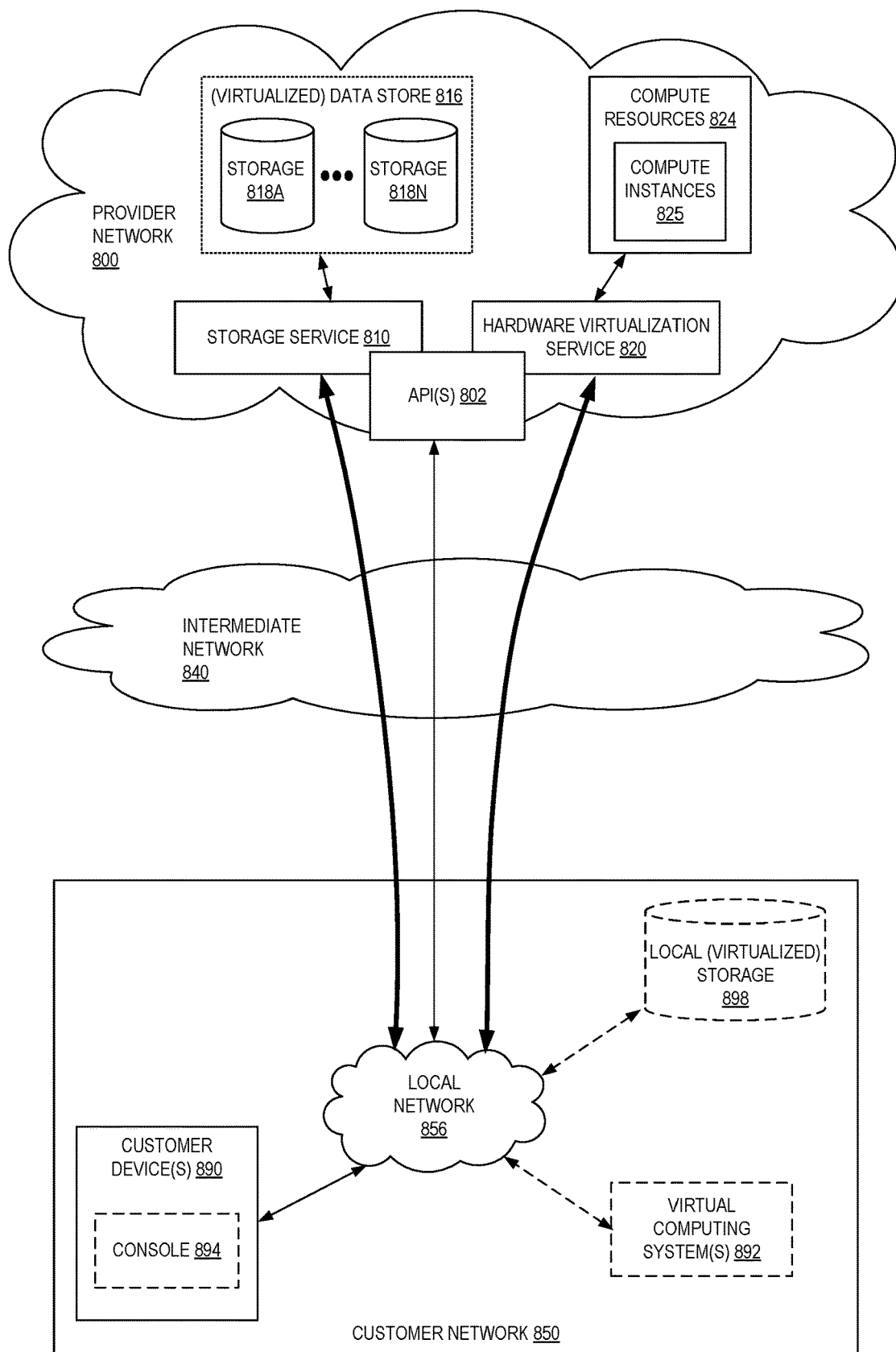
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some embodiments, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
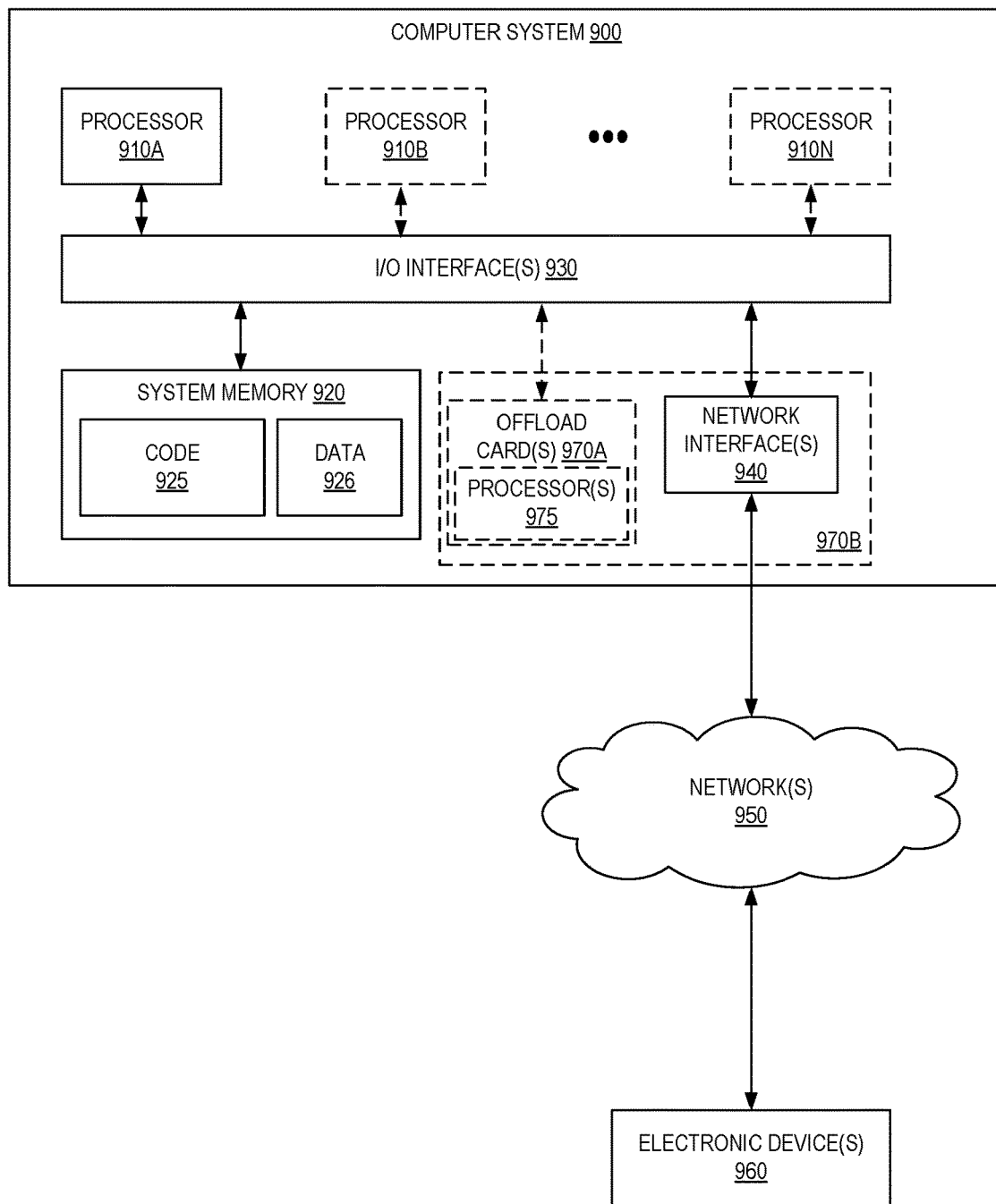
FIG. 9 is a block diagram illustrating an example computer system that can be used in some embodiments.

In some embodiments, a system that implements a portion or all of the techniques described herein can include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodiments, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as code 925 (e.g., executable to implement, in whole or in part, a DAAM, an isolation process, and/or a policy enforcement engine as described herein) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930 can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodiments, the function of the I/O interface 930 can be split into two or more separate components, such as a north bridge and a south bridge, for example. Also, in some embodiments, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and cannot coordinate with (or service) any separate hypervisor.

In some embodiments, the system memory 920 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 818A-818N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   receiving, by one or more components operating in a trusted space from an application in an untrusted space, a portion of user code including a first data access directed to a data source in the trusted space, wherein the trusted space and the untrusted space are separated by a security boundary such that the data source in the trusted space is accessible by the one or more components operating in the trusted space, but access to the data source is controlled for components in the untrusted space;

obtaining an identity associated with the portion of user code;

obtaining a policy including an access control rule that limits access to the data source based at least in part on the identity;

generating data access code by evaluating at least a portion of code associated with the first data access;

obtaining, by a policy enforcement engine, a permitted data access result that complies with the policy by evaluating the data access code, wherein the policy enforcement engine is another instantiation of the application in the trusted space; and sending the permitted data access result to the application in the untrusted space.

2. The computer-implemented method of claim 1, wherein the portion of code associated with the first data access is included in the policy.

3. The computer-implemented method of claim 1, wherein the portion of code associated with the first data access is included in metadata associated with the data source.

4. A computer-implemented method comprising:

receiving, by one or more components operating in a trusted space from an application in an untrusted space, a portion of user code including a first data access directed to a data source in the trusted space, wherein the trusted space and the untrusted space are separated by a security boundary such that the data source in the trusted space is accessible by the one or more components operating in the trusted space, but access to the data source is controlled for components in the untrusted space;

obtaining an identity associated with the portion of user code;

obtaining a policy including an access control rule that limits access to the data source based at least in part on the identity;

generating data access code by evaluating at least a portion of code associated with the first data access;

obtaining a permitted data access result that complies with the policy by evaluating the data access code; and sending the permitted data access result to the application in the untrusted space.

5. The computer-implemented method of claim 4, wherein the portion of code associated with the first data access is included in the policy.

6. The computer-implemented method of claim 5, wherein the portion of code associated with the first data access includes a condition based at least in part on the identity.

7. The computer-implemented method of claim 4, wherein the portion of code associated with the first data access is included in metadata associated with the data source.

8. The computer-implemented method of claim 7, wherein the portion of code associated with the first data access includes a condition based at least in part on the identity.

9. The computer-implemented method of claim 7, wherein the portion of code associated with the first data access is a view identified by the first data access.

10. The computer-implemented method of claim 4, wherein the data access code includes one or more instructions to retrieve first data requested in the first data access and to remove at least a portion of first data to obtain the permitted data access result.

11. The computer-implemented method of claim 4, wherein a policy enforcement engine obtains the permitted data access result by evaluating the data access code, and wherein the policy enforcement engine is another instantiation of the application in a trusted space.

12. The computer-implemented method of claim 4, the security boundary comprising at least one of process-level isolation provided by an operating system, container-level isolation provided by a container engine, virtual machine-level isolation provided by a host computer system, or network-level isolation provided by one or more application programming interfaces.

13. A system comprising:

a first one or more computing resources of a cloud provider network to execute an application in an untrusted space, the application to evaluate user code including a first data access directed to an access-controlled data source in a trusted space; and a second one or more computing resources of the cloud provider network to execute one or more components in the trusted space to isolate the access-controlled data source from the application, wherein the trusted space and the untrusted space are separated by a security boundary such that the access-controlled data source in the trusted space is accessible by the one or more components in the trusted space, but access to the access-controlled data source is controlled for components in the untrusted space, the one or more components including instructions that upon execution cause the one or more components to:

receive, from the application in the untrusted space, a portion of the user code including the first data access directed to the access-controlled data source in the trusted space;

obtain an identity associated with the portion of the user code;

obtain a policy including an access control rule that limits access to the access-controlled data source based at least in part on the identity;

generate data access code by evaluating at least a portion of code associated with the first data access;

obtain a permitted data access result that complies with the policy by evaluating the data access code; and send the permitted data access result to the application in the untrusted space.

14. The system of claim 13, wherein the portion of code associated with the first data access is included in the policy.

15. The system of claim 14, wherein the portion of code associated with the first data access includes a condition based at least in part on the identity.

16. The system of claim 13, wherein the portion of code associated with the first data access is included in metadata associated with the access-controlled data source.

17. The system of claim 16, wherein the portion of code associated with the first data access includes a condition based at least in part on the identity.

18. The system of claim 16, wherein the portion of code associated with the first data access is a view identified by the first data access.

19. The system of claim 13, wherein the data access code includes one or more instructions to retrieve first data requested in the first data access and to remove at least a portion of first data to obtain the permitted data access result.

20. The system of claim 13, wherein the one or more components include a policy enforcement engine that is another instantiation of the application.

* * * * *